H. L. LITCHFIELD.
TRAILER FOR AUTOMOBILES OR OTHER VEHICLES.
APPLICATION FILED NOV. 24, 1915.
1,265,705.
Patented May 7, 1918.
2 SHEETS—SHEET 1.
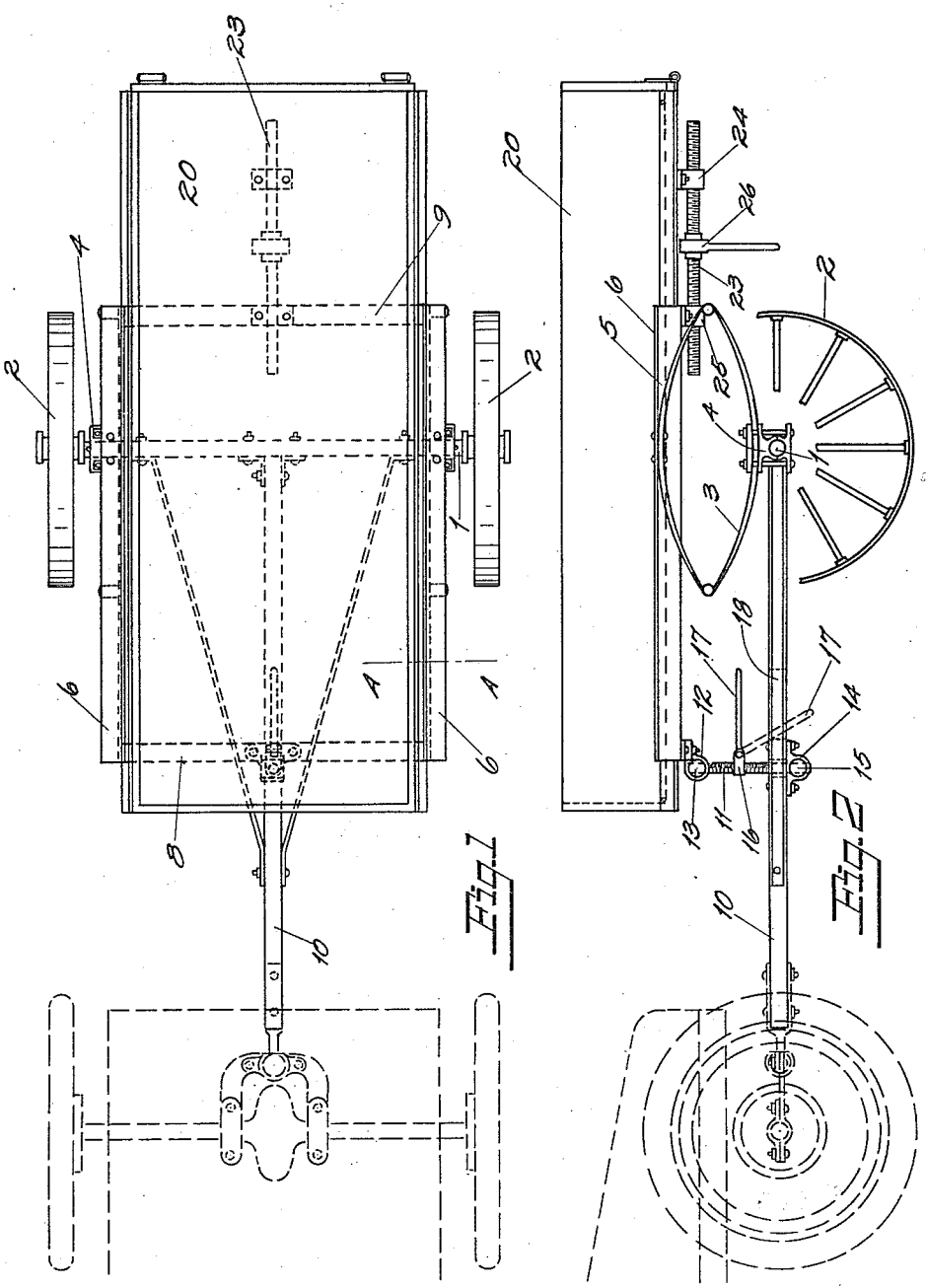
INVENTOR.
H. L. Litchfield
BY
Chamberlin & Frendenreich
ATTORNEYS.

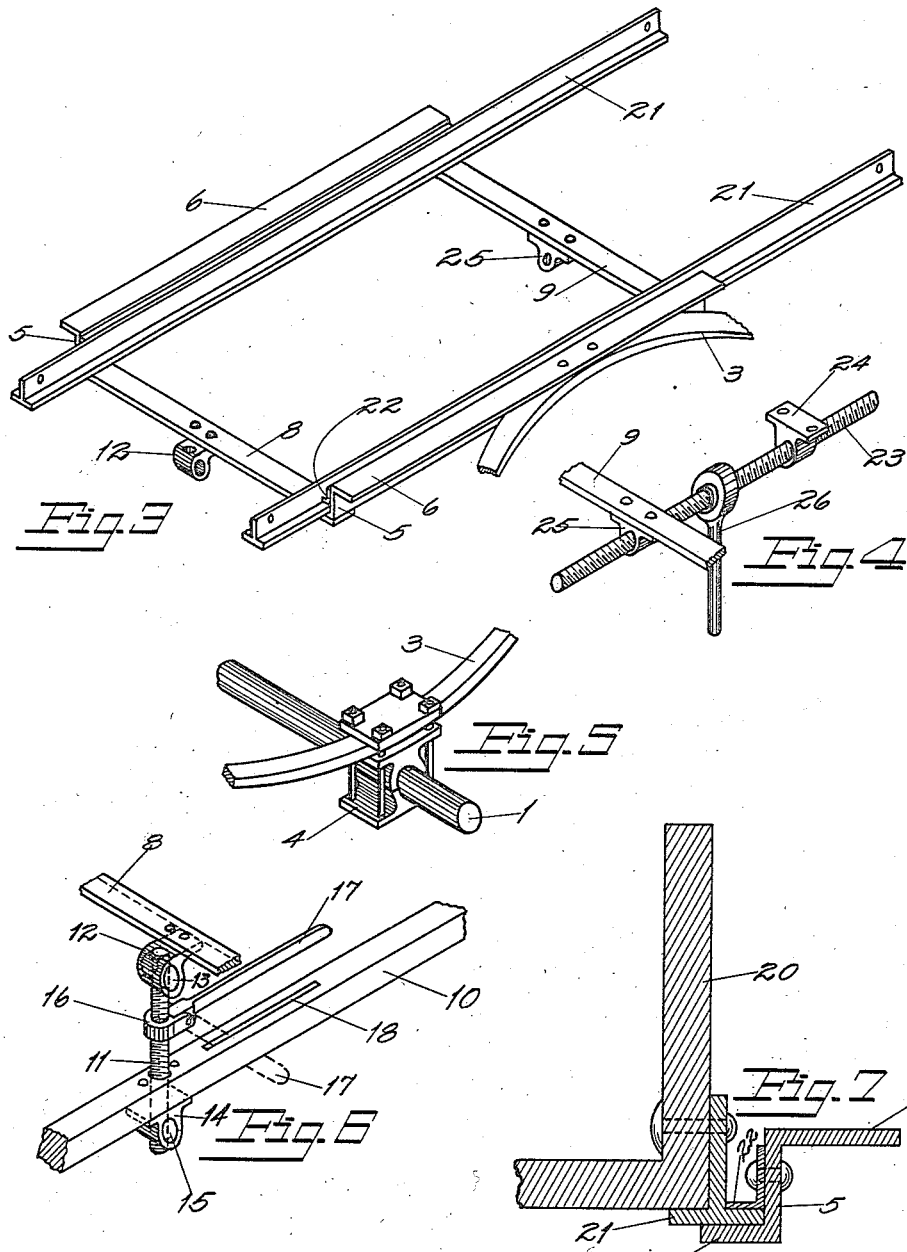

UNITED STATES PATENT OFFICE.

HENRY L. LITCHFIELD, OF WATERLOO, IOWA, ASSIGNOR TO THE LITCHFIELD MANUFACTURING COMPANY, OF WATERLOO, IOWA, A CORPORATION OF IOWA.

TRAILER FOR AUTOMOBILES OR OTHER VEHICLES.

1,265,705. Specification of Letters Patent. Patented May 7, 1918.

Application filed November 24, 1915. Serial No. 63,145.

*To all whom it may concern:*

Be it known that I, HENRY L. LITCHFIELD, a citizen of the United States, residing at Waterloo, county of Blackhawk, State of Iowa, have invented a certain new and useful Improvement in Trailers for Automobiles or other Vehicles, and declare the following to be a full, clear, and exact description of the same, such as will enable others skilled in the art to which it pertains to make and use the same, reference being had to the accompanying drawings, which form a part of this specification.

My invention has for its object to produce a simple and efficient vehicle adapted to be attached as a trailer to an automobile or other vehicle.

One of the subsidiary objects of my invention is to produce a trailer for a vehicle which will permit the load carried by the trailer to be distributed quickly and conveniently in any desired proportions, within limits between the vehicle and the trailer.

In carrying out my invention I employ only two supporting wheels for the trailer and therefore, considered in some of its aspects, my invention may be said to have for its objects to produce a simple and novel two wheeled trailer so constructed that it may be attached at different elevations to an automobile or other vehicle, without securing an unsatisfactory disposition of the load and to provide simple means for shifting the center of gravity of the load quickly and conveniently after the trailer is loaded.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a vehicle arranged in accordance with a preferred form of my invention, the rear end of the towing vehicle being shown in dotted lines;

Fig. 2 is a side view of the two vehicles illustrated in Fig. 1, the towing vehicle being in dotted lines and a portion of the near wheel of the trailing vehicle being broken away;

Fig. 3 is a perspective view of the supporting frame for the body of my improved vehicle, together with the tracks or shoes supported thereby and in turn supporting the body or bed;

Fig. 4 is a perspective view of the screw device for shifting the body or bed backward and forward on the supporting frame;

Fig. 5 is a perspective view of a fragment of the axle and the connection between the same and one of the springs on which the supporting frame for the body or bed is carried;

Fig. 6 is a perspective view of a fragment of the tongue or reach and the elevating mechanism between the same and the front end of the supporting frame for the bed or body; and Fig. 7 is a section on an enlarged scale taken approximately on line A—A of Fig. 1.

Referring to the drawing, 1 represents an axle on the ends of which are wheels, 2. Above the axle are a plurality of springs, 3, which, in the arrangement shown, are elliptic springs. The springs are attached to the axle by means of suitable saddles, 4. Upon these springs is supported a frame or platform consisting conveniently of two Z-bars, (where there are two springs, as illustrated,) lying at right angles to the axle, each with its web portion, 5, arranged in a vertical plane at the inner side of one of the springs, its upper horizontal flange, 6, projecting outwardly above the corresponding spring and its lower horizontal flange, 7, extending inwardly. The two Z-bars may conveniently be connected together by a front cross piece, 8, and a rear cross piece, 9, underlying and secured to the lower flanges, 7. The upper flanges of the side bars of the platform or frame are secured to the springs in any suitable manner. To the axle is secured a forwardly projecting tongue or reach, 10, and between the same and the front end of the platform or frame is an adjustable support. This support may conveniently consist of a post, 11, having the upper and lower portions threaded in opposite directions and passing through suitable threaded openings in the frame or platform and in the tongue or reach, respectively. In the arrangement shown, there is arranged on the under side of the front bar, 8, of the platform or frame a bracket, 12, in which is supported a nut, 13, adapted to rotate about a transverse horizontal axis. Just below the bracket 12 is a bracket, 14, arranged on the under side of the tongue or reach and containing a nut, 15, adapted to be rotatable about a horizontal transverse axis. The screw threaded post, 11, extends into or through both of the nuts 13 and 15 so that by turning the post in one direction or the other, the front end of the platform or frame may be raised or lowered and at the same time the nuts will shift their positions in the supporting brackets sufficiently to prevent binding. In order to turn the post I have arranged at the middle thereof a suitable actuating device, 16, having a hinged handle, 17, long enough to drop down through a slot, 18, in the tongue or reach; the hinged axis of the handle being transverse so that when the handle projects down through the slot 18 it serves as a locking dog to prevent accidental rotation of the post.

The platform or frame may have any desired length and be disposed in any desired way upon the supporting springs and the supporting post, but I prefer to arrange it so that the greater portion will lie in front of the axle, bringing the springs under the rear end.

A wagon bed or body or box, 20, of any usual or suitable construction rests upon and is supported by the platform or frame. In the arrangement shown, there is fastened at each side of the body a rail, 21, in the form of a T-bar having its web resting against the side of the body, one flange extending underneath the body, and the other flange overlying one of the flanges, 7, of the side bars of the platform or frame; the flanges, 7, therefore serving as supporting tracks or guides and the rails 21 as shoes adapted to rest upon the tracks or guides. The body is held against vertical displacement on the supporting platform by means of cleats, 22, which may conveniently take the form of angle irons each having one flange secured to the web, 5, of one of the side bars of the frame and having its other flange extending across the top of the outermost flange of the corresponding rail or shoe on the body; the cleats spaced apart from the flanges 7 a distance sufficient to permit the body to be moved back and forth freely.

Between the body and its support is arranged means for preventing accidental displacement, and this means is preferably so constructed that it will also serve as an adjusting or shifting device by means of which the body may be shifted back and forth. In the arrangement shown, this device consists of a rod, 23, having its ends screw threaded in opposite directions, one end of the rod passing through a suitable nut, 24, fixed to the under side of the body in rear of the supporting frame and the other end of the rod passing through a suitable nut, 25, secured to the under side of the rear cross member, 9, of the platform or frame at the middle of such cross bar. A suitable handled ratchet device, 26, located at the middle of the rod, 23, serves to turn the rod for the purpose of shifting the body back and forth.

In using my improved vehicle the front end of the tongue or reach is secured to the rear end of an automobile or other towing vehicle. The body may be maintained horizontal, regardless of the height of the point of attachment of the tongue or reach to the towing vehicle, by simply adjusting the supporting post, 11. After the trailer has been loaded the center of gravity of the load may be shifted backward or forward by the adjusting screw, 23, so as to balance the load upon the wheels of the trailer or distribute the load in any desired proportion within limits between the trailer and the towing vehicle. This feature is of great importance. If the automobile that is towing the trailer, or the trailer gets into a mud hole, or if any other situation arises in which it is desirable either to get more traction on the automobile or to reduce the weight on the wheels of the trailer, the driver can readily shift his load to secure the desired results.

It will thus be seen that I have produced a simple, light, strong and durable load-carrying vehicle or machine capable of being successfully hitched to the rear end of an automobile, regardless of the elevation of the attaching point, and of providing in a unique way for distributing the load, after being loaded, to give the best results under normal running conditions and to give very advantageous and unusual results under certain abnormal conditions.

In the drawings and in the detailed description I have, for the sake of brevity, confined myself to a single practical embodiment of my invention in which the tiltable support for the adjustable load is a two-wheeled axle and tongue or reach; but I desire to have it understood that, in its broadest aspects, my invention is not limited to the specific arrangement but may take various other forms and designs as will be evident from the definitions of my invention constituting the appended claims.

I claim:

1. In combination, a wheeled axle, a tongue connected to the axle for hauling the same, a body above the axle and tongue, and supporting means between the body and the axle and tongue for holding the body parallel with or at an angle to the tongue, and means for adjusting the position of the body in the direction of the length of the tongue.

2. In combination, a wheeled axle, a tongue secured to and projecting from the axle, a frame lying above the axle, springs between the frame and the axle, an adjustable support between the tongue and the frame, a body mounted on said frame, and means for adjusting the body along the frame in the direction of the length of the tongue.

3. In combination, a wheeled axle, a tongue member secured to and projecting from said axle, a load-carrying member arranged above the axle and the tongue member, springs between the load-carrying member and the axle, a screw threaded post arranged between the tongue member and the load-carrying member, one of the latter members having a screw threaded part engaging with said post, means including a pivoted handle for turning said post, and said tongue having a slot therein for the reception of the handle.

4. In combination, a wheeled axle, a tongue secured to and projecting from the axle, a support arranged above the axle and the tongue, said support comprising side members in the form of tracks or guides and cross members connecting said tracks or guides together, a spring between each of said side members and the axle, and a supporting post arranged between the tongue and one of said cross members, and a vehicle body or bed slidably mounted on said tracks or guides.

5. In combination, a wheeled axle, a tongue secured to and projecting from the axle, a support arranged above the axle and the tongue, said support comprising side members in the form of tracks or guides and cross members connecting said tracks or guides together, a spring between each of said side members and the axle, a supporting post arranged between the tongue and one of said cross members, a vehicle body or bed slidably mounted on said tracks or guides, and means for adjusting said post to vary the angle between the tongue and the said support.

6. In combination, a wheeled axle, a tongue secured to and projecting from the axle, a support arranged above the axle and the tongue, said support comprising side members in the form of tracks or guides and cross members connecting said tracks or guides together, a spring between each of said side members and the axle, a supporting post arranged between the tongue and one of said cross members, a vehicle body or bed slidably mounted on said tracks or guides, means for adjusting said post to vary the angle between the tongue and the said support, and a screw device for adjusting the body or bed lengthwise of the tracks or guides.

7. In a vehicle trailer, a wheeled frame supporting a slidably mounted load-carrying body, a reach for connecting said trailer with the towing vehicle, means for adjusting said body in a line parallel with said reach and means for adjusting the angle between said frame and said reach.

8. In a vehicle trailer, a wheeled axle, means for supporting on the axle a load-carrying body so as to permit the latter to be adjusted in the direction of its length relatively to the axle, a reach for connecting said trailer with a towing vehicle, means for adjusting said body in a line parallel with said reach and means for adjusting the angle between said body and said reach.

9. In combination, a towing vehicle, a wheeled axle, a reach connected at the rear end to said axle and at the front end to the towing vehicle, a load-carrying body on said axle, and means for adjusting said body in the direction of the length of the reach and also angularly about a transverse axis.

10. In combination, a towing vehicle, a wheeled axle, a reach connecting said wheeled axle to the towing vehicle, a load-carrying body, and means for supporting said body partly from the reach and partly from the axle so as to permit the body to be adjusted in the direction of the length of the reach to vary the distribution of the static load between the towing vehicle and said axle.

11. In combination, a towing vehicle, a wheeled axle, a reach connecting said axle to the towing vehicle, and a load-carrying body mounted on the axle and reach so as to be adjustable longitudinally and permit the whole load to be borne by said axle or a considerable part of the static load to be borne by the towing vehicle to increase the tractive capacity of the towing vehicle from a position of rest.

In testimony whereof, I sign this specification.

HENRY L. LITCHFIELD.